United States Patent
Wen

(10) Patent No.: US 9,735,598 B2
(45) Date of Patent: Aug. 15, 2017

(54) RECHARGE METHOD AND ELECTRONIC DEVICE USING SAME

(71) Applicants: HONGFUJIN PRECISION ELECTRONICS (ZHENGZHOU) CO.,LTD., Zhengzhou (CN); HON HAI PRECISION INDUSTRY CO., LTD., New Taipei (TW)

(72) Inventor: Yu-Jing Wen, Shenzhen (CN)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 182 days.

(21) Appl. No.: 14/725,105

(22) Filed: May 29, 2015

(65) Prior Publication Data

US 2016/0156210 A1  Jun. 2, 2016

(30) Foreign Application Priority Data

Nov. 28, 2014 (CN) .......................... 2014 1 0707804

(51) Int. Cl.
*H02J 7/00* (2006.01)
*H02J 7/04* (2006.01)

(52) U.S. Cl.
CPC ............ *H02J 7/0052* (2013.01); *H02J 7/007* (2013.01); *H02J 7/045* (2013.01); *H02J 2007/0096* (2013.01); *Y02B 40/90* (2013.01)

(58) Field of Classification Search
CPC ....... Y02E 60/12; H02J 7/0042; H02J 7/0045; H01M 10/46; H01M 10/44
USPC .......................................... 320/107
See application file for complete search history.

(56) References Cited

U.S. PATENT DOCUMENTS 5,481,177 A * 1/1996 Hamley .................. H02J 7/008
320/111
5,764,030 A * 6/1998 Gaza ..................... H02J 7/0004
320/116

* cited by examiner

*Primary Examiner* — Arun Williams
(74) *Attorney, Agent, or Firm* — Steven Reiss

(57) ABSTRACT

A recharge method and an electronic device using the recharge method are provided. The recharge method includes: determining, at an electronic device, whether a charger coupled with the electronic device has an adjustable output voltage; controlling, at the electronic device, the charger to recharge a battery of the electronic device in a first recharge mode in which the battery is recharged with a optimum recharge voltage if the charger has an adjustable output voltage; and controlling, at the electronic device, the charger to recharge the battery in a second recharge mode in which the battery is recharged with a constant recharge voltage if the recharger has a constant output voltage.

11 Claims, 5 Drawing Sheets

RECHARGE METHOD AND ELECTRONIC DEVICE USING SAME

FIELD

The subject matter herein generally relates to a recharge method and an electronic device using the same.

BACKGROUND

Rechargeable batteries are widely used in various electronic devices. Currently available charge systems are in a same operation mode regardless of a type of a battery charger. However, some chargers have an adjustable output voltage, while others have a constant output voltage. There is a need for an adaptive recharge system and method according to a type of a charger.

BRIEF DESCRIPTION OF THE DRAWINGS

Implementations of the present technology will now be described, by way of example only, with reference to the attached figures.

DETAILED DESCRIPTION

Figure 1:
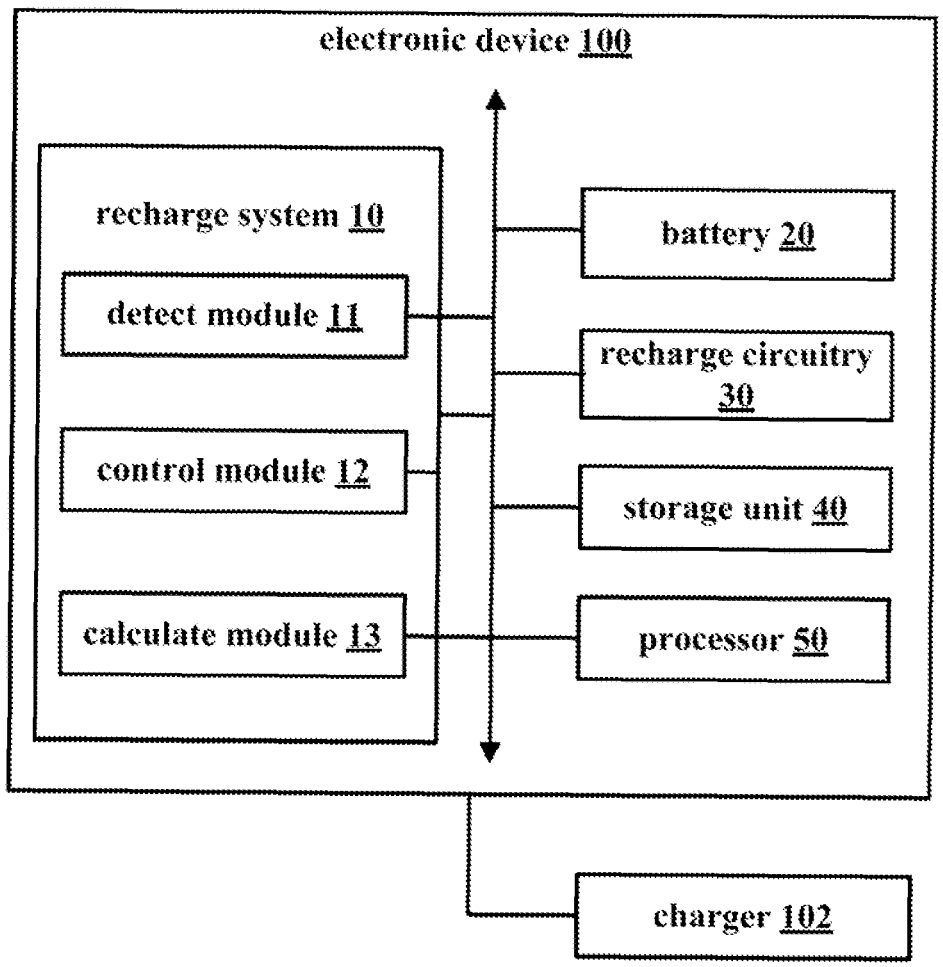
FIG. 1 is a block diagram of an exemplary embodiment of an electronic device with a recharge system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

A definition that applies throughout this disclosure will now be presented.

The term "comprising," when utilized, means "including, but not necessarily limited to"; it specifically indicates open-ended inclusion or membership in the so-described combination, group, series and the like.

FIG. 1 illustrates a diagrammatic block diagram of an exemplary embodiment of an electronic device 100. In the example embodiment, the electronic device 100 can include, but not limited to, a battery 20, a recharge circuitry 30, a storage unit 40, and a processor 50. The battery 20 can be configured to power the electronic device 100. The recharge circuitry 30 can be configured to be coupled with the battery 20 and to recharge the battery 20. The storage unit 40 can be configured to store instructions that can be performed by the processor 50 to control operations of the electronic device 100.

The processor 50 can be a central processing unit (CPU), a microprocessor, or other data processor chip that performs functions of the electronic device 100. The storage unit 40 can be an internal storage unit of the electronic device 100, for example, a hard disk or memory, or a pluggable memory, for example, Smart Media Card, Secure Digital Card, Flash Card. In at least one embodiment, the storage unit 40 can include two or more storage devices such that one storage device is an internal storage unit and the other storage device is a pluggable memory.

A recharge system 10 can include computerized instructions in the form of one or more programs that can be executed by the processor 50. In the embodiment, the recharge system 10 can be integrated in the processor 50. In at least one embodiment, the recharge system 10 can be independent from the processor 50 and can be stored in the storage unit 40 and coupled to the processor 50. Referring to FIG. 1, the system 10 can include one or more modules, for example, a detect module 11, a control module 12, and a calculate module 13. A "module," as used herein, refers to logic embodied in hardware or firmware, or to a collection of software instructions, written in a programming language, such as, JAVA, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

The detect module 11 can be configured to detect a current voltage of the battery 20 and an output voltage of a charger 102 to determine whether an output voltage of the charger 102 is adjustable. The control module 12 can be configured to transmit a control signal to the charger 102 to switch between a first recharge mode in which the recharge voltage is optimum and a second recharge mode in which the recharge voltage is constant. If the output voltage of the charger 102 is adjustable, the battery 20 can be recharged in the first recharge mode, while if the output voltage of the charger 102 is constant, the battery 20 can be recharged in the second recharge mode. The calculate module 13 can be configured to calculate an optimum recharge voltage based on the current voltage of the battery 20 and the target full voltage.

Figure 2:
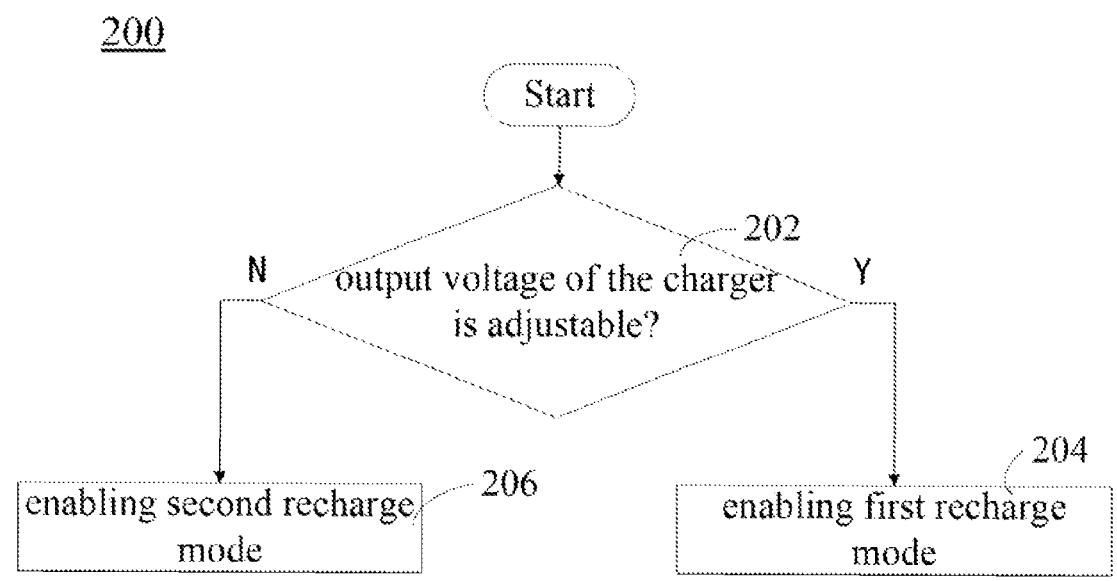
FIG. 2 is a flowchart of an exemplary embodiment of a recharge method.

Referring to FIG. 2, a flowchart is presented in accordance with an example embodiment which is being thus illustrated. The example method 200 is provided by way of example, as there are a variety of ways to carry out the method. The method 200 described below can be carried out using the configurations illustrated in FIG. 1, for example, and various elements of the figure is referenced in explaining example method 200. Each block shown in FIG. 2 represents one or more processes, methods or subroutines, carried out in the exemplary method 200. Furthermore, the illustrated order of blocks is by example only and the order of the blocks can change according to the present disclosure. Additional blocks may be added or fewer blocks may be utilized, without departing from this disclosure. The exemplary recharge method 200 is illustrated in FIG. 2. The exemplary method 200 can be executed by an electronic device which is powered by a rechargeable battery, and can begin at block 202. The electronic device can include a recharger circuitry configured to charge the battery.

At block 202, the electronic device detects whether an output voltage of a charger coupled to the recharge circuitry is adjustable. The process goes to block 204 if the output voltage of the charger is adjustable; otherwise the process goes to block 206 if the output voltage of the charger is constant.

At block 204, the electronic device controls the battery is recharged in a first recharge mode in which the battery is recharged with an optimum recharge voltage.

At block 206, the electronic device controls the battery is recharged in a second recharge mode in which the battery is recharged with a constant recharge voltage.

Figure 3:
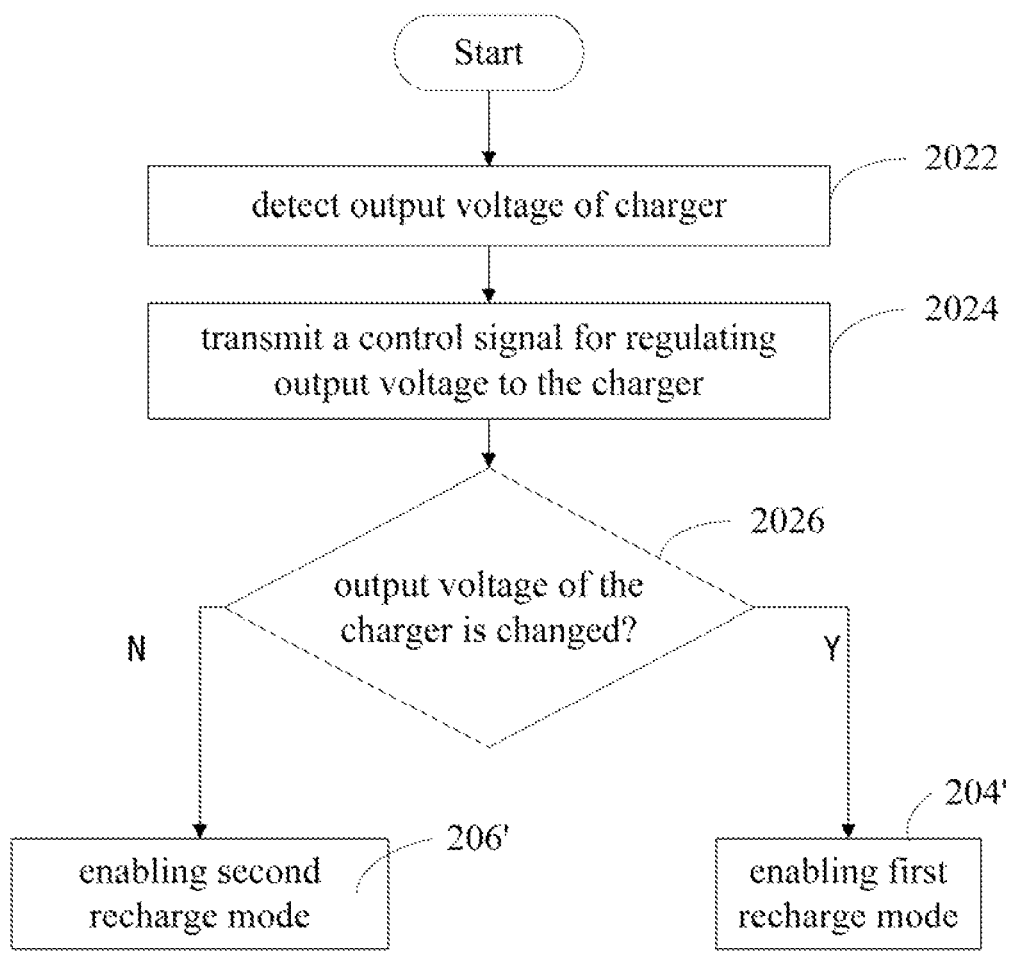
FIG. 3 is another flowchart of an exemplary embodiment of a recharge method.

Referring to FIG. 3, an exemplary flowchart 300 of the recharge method is illustrated. The flowchart 300 illustrates an exemplary detail process to detect whether the output voltage of the charger is adjustable. The flowchart can begin at block 2022.

At block 2022, the electronic device detects a current output voltage of the charger as the connection between the charger and the electronic device is established.

At block 2024, the electronic device transmits a control signal to the charger to regulate the output voltage of the charger to be a second voltage which is different from the current output voltage of the charger. In the exemplary embodiment, the control signal is a pulse. The electronic device transmits one or more zero current pulses to enable the charger to regulate the current output voltage of the charger.

At block 2026, the electronic device detects the current output voltage of the charger to determine whether the current output voltage changed in response to the control signal. If the output voltage of the charger is changed to be the second voltage, the output voltage of the charger is determined to be adjustable and the process goes to block 204' which can be operated in a same way with block 204 shown in FIG. 2. Otherwise, if the output voltage of the charger remains unchanged, the output voltage of the charger is determined to be constant and the process goes to block 206' which can be operated in a same way with block 206 shown in FIG. 2.

Figure 4:
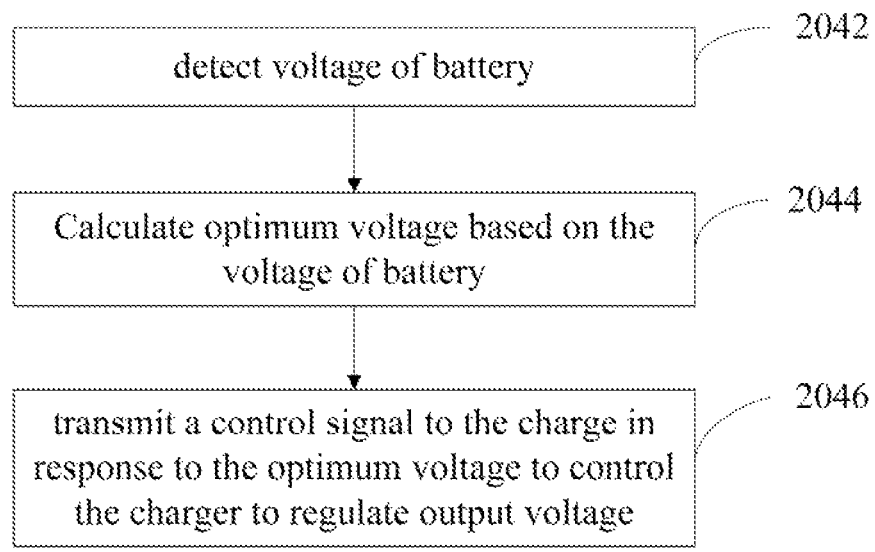
FIG. 4 is another flowchart of an exemplary embodiment of a recharge method.

Referring to FIG. 4, an exemplary flowchart 400 of the recharge method is illustrated. The flowchart 400 illustrates an exemplary detail operation process of the first recharge mode shown in FIG. 2. The flowchart can begin at block 2042.

At block 2042, the electronic device detects a current voltage of the battery.

At block 2044, the electronic device calculates an optimum recharge voltage based on the current voltage of the battery. In an exemplary embodiment, the electronic device detects a rated voltage of the recharge circuitry and then calculates a sum of the current voltage of the battery and the rated voltage of the recharge circuitry. The sum of the current voltage of the battery and the rated voltage of the recharge circuitry is then used as the optimum recharge voltage. The sum may be approximate via rounding.

Figure 5:
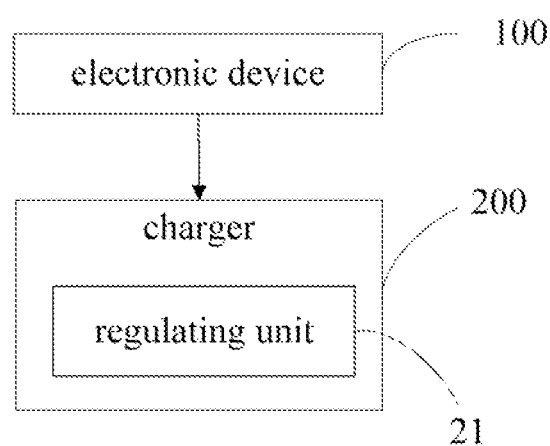
FIG. 5 is a diagram of an exemplary embodiment of a charger with an adjustable output voltage.

At block 2046, the electronic device generates a control signal based on the optimum recharge voltage and then transmits the control signal to the charger to regulate the output voltage of the charger. In an exemplary embodiment, referring to FIG. 5, the charger 102 can include a regulating unit 21 configured to regulate the current output voltage of the charger in response to the control signal from the electronic device 100. In the exemplary embodiment, the regulating unit 21 can regulate the current output voltage to be the optimum recharge voltage.

In another exemplary embodiment, the electronic device can include a storage unit configured to store a relationship between battery voltage ranges and optimum recharge voltage ranges and a relationship between optimum recharge voltage ranges and recharge voltages. Exemplary relationships can be illustrated as following table 1. Each battery voltage range is corresponding to an optimum recharge voltage range which is corresponding to a recharge voltage. The electronic device determines a optimum recharge voltage corresponding to a recharge voltage range in which the sum calculated in block 2044 falls. The electronic device generates a control signal based on the optimum recharge voltage and then transmits the control signal to the charger. The control signal can cause the charger to regulate the current output voltage of the charger to be the optimum recharger voltage.

In another exemplary embodiment, the electronic device determines the optimum recharge voltage based on the current voltage of the battery which is detected in block 2042. In detail, the electronic device first determines a battery voltage range in which the current voltage of the battery falls in and then determines the optimum recharge voltage corresponding to the battery voltage range. The electronic device then generates a control signal based on the optimum recharge voltage and then transmits the control signal to the charger to cause the charger to regulate the current output voltage of the charger to be the optimum recharge voltage.

TABLE 1

| Battery Voltage range | Recharge Voltage range | Optimum Recharge Voltage |
| --- | --- | --- |
| 3.4 V-3.5 V | 4.2 V-4.3 V | 4.2 V |
| 3.5 V-3.7 V | 4.3 V-4.5 V | 4.4 V |
| 3.7 V-4.0 V | 4.5 V-4.8 V | 4.8 V |
| 4.0 V-4.2 V | 4.8 V-5.0 V | 5.0 V |

Disclosed embodiments of the recharge method and the electronic device using the recharge method can minimize voltage through the recharge circuitry or maximized current through the recharge circuitry by causing the charge to regulate the current output voltage based on the current voltage of the battery, thereby reducing heat loss and promoting recharge speed and efficiency.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A recharge method, comprising:
    determining, at an electronic device, whether a charger coupled with the electronic device has an adjustable output voltage, wherein said determining whether the charger has an adjustable output voltage comprises:
        detecting, at the electronic device, a current output voltage of the charger;

transmitting, at the electronic device, a control signal to cause the charger to regulate its output voltage to be a second voltage which is different from the current output voltage;
detecting, at the electronic device, a current output voltage of the charger;
determining, at the electronic device, the charger has an adjustable output voltage if the current output voltage is changed to be the second voltage; and
determining, at the electronic device, the charger has a constant output voltage if the current output voltage remains unchanged;
controlling, at the electronic device, the charger to recharge a battery of the electronic device in a first recharge mode in which the battery is recharged with an optimum recharge voltage if the charger has an adjustable output voltage, wherein the optimum recharge voltage changes is in response to a current voltage of the battery; and
controlling, at the electronic device, the charger to recharge the battery in a second recharge mode in which the battery is recharged with a constant recharge voltage if the charger has a constant output voltage.

2. The method according to claim 1, wherein the first recharge mode comprises:
detecting, at the electronic device, a current output voltage of the battery;
calculating, at the electronic device, an optimum recharge voltage based on the current voltage of the battery; and
generating, at the electronic device, a control signal based on the optimum recharge voltage to be transmitted to the charger to regulate the current output voltage of the charger to be the optimum recharger voltage.

3. The method according to claim 2, further comprising:
detecting, at the electronic device, a rated voltage of a recharge circuitry coupled with the battery; and
calculating, at the electronic device, the optimum recharge voltage as a sum of the rated voltage of the recharge circuitry and a current voltage of the battery.

4. The method according to claim 2, further comprising: determining the optimum recharge voltage based on a table defining a relationship between recharge voltage ranges and optimum recharge voltages, each recharge voltage range being corresponding to an optimum recharge voltage, wherein the determined optimum recharge voltage is corresponding to a recharge voltage range in which the sum of the rated voltage of the recharge circuitry and a current voltage of the battery falls.

5. The method according to claim 2, further comprising: determining the optimum recharge voltage based on a table defining a relationship between battery voltage ranges and optimum recharge voltages, each battery voltage range being corresponding to an optimum recharge voltage, wherein the determined optimum recharge voltage is corresponding to a battery voltage range in which the current voltage of the battery falls.

6. An electronic device, comprising:
a battery configured to power the electronic device;
a recharge circuitry configured to be coupled with the battery to recharge the battery;
a storage unit configured to store instructions; and
a processor configured to execute instructions to cause the processor to:
determine whether a charger coupled with the recharge circuitry has an adjustable output voltage, wherein the instructions cause the processor to:
detect a current output voltage of the charger;
transmit a control signal to cause the charger to regulate its output voltage to be a second voltage which is different from the current output voltage;
detect a current output voltage of the charger;
determine the charger has an adjustable output voltage if the current output voltage is changed to be the second voltage; and
determine the charger has a constant output voltage if the current output voltage remains unchanged;
control the charger to recharge the battery of the electronic device in a first recharge mode in which the battery is recharged with an optimum recharge voltage if the charger has an adjustable output voltage, wherein the optimum recharge voltage changes in response to a current voltage of the battery; and
control the charger to recharge the battery in a second recharge mode in which the battery is recharged with a constant recharge voltage if the charger has a constant output voltage.

7. The electronic device according to claim 6, wherein the instructions cause the processor to:
detect a current output voltage of the battery;
calculate an optimum recharge voltage based on the current output voltage of the battery; and
generate a control signal based on the optimum recharge voltage to be transmitted to the charger to regulate the current output voltage of the charger to be the optimum recharger voltage.

8. The electronic device according to claim 6, wherein the instructions cause the processor to:
detect a rated voltage of a recharge circuitry coupled with the battery; and
calculate the optimum recharge voltage as a sum of the rated voltage of the recharge circuitry and a current voltage of the battery.

9. The electronic device according to claim 6, further comprising a storage unit configured to store a table defining a relationship between recharge voltage ranges and optimum recharge voltages, each recharge voltage range being corresponding to an optimum recharge voltage; wherein the instructions cause the processor to: determine the optimum recharge voltage based on the table, and the determined optimum recharge voltage is corresponding to a recharge voltage range in which the sum of the rated voltage of the recharge circuitry and a current voltage of the battery falls.

10. The electronic device according to claim 6, further comprising a storage unit configured to store a table defining a relationship between battery voltage ranges and optimum recharge voltages, each battery voltage range being corresponding to an optimum recharge voltage, wherein the instructions cause the processor to: determine the optimum recharge voltage based on the table, and the determined optimum recharge voltage is corresponding to a battery voltage range in which the current voltage of the battery falls.

11. A recharge method for recharging a battery of an electronic device, comprising:
determining whether a charger coupled with the electronic device has an adjustable output voltage or a constant output voltage, wherein said determining whether the charger has an adjustable output voltage comprises:
detecting, at the electronic device, a current output voltage of the charger;
transmitting, at the electronic device, a control signal to cause the charger to regulate its output voltage to be a second voltage which is different from the current output voltage;

detecting, at the electronic device, a current output voltage of the charger;

determining, at the electronic device, the charger has an adjustable output voltage if the current output voltage is changed to be the second voltage; and determining, at the electronic device, the charger has a constant output voltage if the current output voltage remains unchanged;

in response to determining that the charger has an adjustable output voltage:

determining a rated voltage of recharge circuitry of the electronic device;

determining a current voltage of the electronic device;

recharging a battery of the electronic device with an optimum output voltage representing the sum of the rated voltage and the current voltage; and recharging the battery with a constant preset recharge voltage if the charger has a constant output voltage.

\* \* \* \* \*